(12) United States Patent
Wiesenberg et al.

(10) Patent No.: US 11,781,881 B2
(45) Date of Patent: Oct. 10, 2023

(54) METHODS AND APPARATUS OF VEHICLE GUIDANCE

(71) Applicant: Toyota Motor Engineering & Manufacturing North America, Inc., Plano, TX (US)

(72) Inventors: Ryan M. Wiesenberg, Ann Arbor, MI (US); Matthew R. Kiefer, Ypsilanti, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 179 days.

(21) Appl. No.: 16/712,625

(22) Filed: Dec. 12, 2019

(65) Prior Publication Data

US 2021/0180977 A1 Jun. 17, 2021

(51) Int. Cl.
*G01C 21/36* (2006.01)
*G01C 21/34* (2006.01)

(52) U.S. Cl.
CPC ..... *G01C 21/3676* (2013.01); *G01C 21/3492* (2013.01)

(58) Field of Classification Search
CPC .......... G01C 21/3676; G01C 21/3492
See application file for complete search history.

(56) References Cited

U.S. PATENT DOCUMENTS

| 8,401,733 | B2 | 3/2013 | Weslati et al. | |
|---|---|---|---|---|
| 8,897,948 | B2* | 11/2014 | Caveney | G08G 1/162 |
| | | | | 701/425 |
| 9,723,469 | B2 | 8/2017 | Truong et al. | |
| 2004/0183663 | A1* | 9/2004 | Shimakage | G06T 7/73 |
| | | | | 701/1 |
| 2005/0261824 | A1* | 11/2005 | Furukawa | G08G 1/096775 |
| | | | | 340/995.19 |
| 2007/0179709 | A1* | 8/2007 | Doyle | G01C 21/3453 |
| | | | | 701/417 |

(Continued)

FOREIGN PATENT DOCUMENTS

| CN | 101251389 A | 8/2008 |
|---|---|---|
| JP | 2007-192619 | 8/2007 |

*Primary Examiner* — Rami Khatib
*Assistant Examiner* — Gabriel Joseph Rene Lambert
(74) *Attorney, Agent, or Firm* — Oblon, McClelland, Maier & Neustadt, L.L.P.

(57) ABSTRACT

The present disclosure relates to an apparatus and method for vehicle guidance. In an embodiment, the present disclosure relates to a method of vehicle guidance including determining a current lane-level position of a vehicle, comparing the determined current lane-level position of the vehicle to an anticipated lane-level position of the vehicle, the anticipated lane-level position of the vehicle corresponding to a lane-level position of the vehicle within a predetermined route of the vehicle, receiving, based upon the comparison, an input regarding an intended route of the vehicle, and generating, via processing circuitry, guidance information based on the received input regarding the intended route of the vehicle, wherein the receiving the input regarding the intended route of the vehicle includes determining alternate routes between a current position of the vehicle and a destination of the vehicle based on the determined current lane-level position of the vehicle.

20 Claims, 11 Drawing Sheets

(56) References Cited

U.S. PATENT DOCUMENTS

| | | | |
|---|---|---|---|
| 2012/0078507 A1* | 3/2012 | Caveney | G08G 1/096716 |
| | | | 701/414 |
| 2014/0005923 A1* | 1/2014 | Bank | G01C 21/3617 |
| | | | 701/424 |
| 2014/0012501 A1* | 1/2014 | Hahne | G01C 21/34 |
| | | | 701/533 |
| 2015/0363841 A1 | 12/2015 | Richie et al. | |
| 2017/0076598 A1 | 3/2017 | Scofield et al. | |
| 2017/0261987 A1* | 9/2017 | Takahashi | G05D 1/0088 |
| 2018/0217604 A1* | 8/2018 | Nakajima | G05D 1/0088 |
| 2019/0176846 A1* | 6/2019 | Movert | G06F 16/2455 |
| 2019/0376798 A1* | 12/2019 | Abramson | G01C 21/3641 |
| 2020/0090514 A1* | 3/2020 | Sakaguchi | G08G 1/0965 |
| 2020/0124439 A1* | 4/2020 | Fowe | G01C 21/3811 |
| 2020/0132477 A1* | 4/2020 | Averilla | G01S 17/931 |
| 2020/0307380 A1* | 10/2020 | Ikeda | G06V 20/588 |

\* cited by examiner

METHODS AND APPARATUS OF VEHICLE GUIDANCE

BACKGROUND

Though navigational systems are presently ubiquitous in vehicles, mobile devices, and the like, these navigational systems rely on predetermined routes and relative positions of users thereto in providing guidance during travel between an origin and a destination. As a result, in the case of a human operated vehicle, a driver may deviate from the predetermined route for a significant period of time before the navigational system recognizes the predetermined route is no longer being followed. Such an issue may become exacerbated when the driver is traveling on a multi-lane roadway. U.S. Patent Publication No. 2017/0076598 entitled "Driving lane change suggestions", by Scofield and Sedlik, is directed to a device configured to formulate lane change suggestions by detecting a current lane of the driver, comparing the travel conditions of the current lane with the travel conditions of other lanes, and presenting a lane change suggestion of another lane presenting advantageous travel conditions. This approach, however, fails to consider the time-dependency of vehicle navigation in relying on the presence of adverse travel conditions, instead ignoring the relative position of the vehicle to the adverse travel condition and to alternative routes.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

The present disclosure relates to a method and apparatus of vehicle guidance.

According to an embodiment, the present disclosure further relates to a method of vehicle guidance, comprising determining a current value of a metric of a vehicle, comparing the determined current value of the metric of the vehicle to an anticipated value of the metric of the vehicle, the anticipated value of the metric of the vehicle corresponding to a value of the metric of the vehicle along a predetermined route of the vehicle, receiving, based upon the comparison, an input regarding an intended route of the vehicle, and generating, via processing circuitry, guidance information based on the received input regarding the intended route of the vehicle.

According to an embodiment, the present disclosure further relates to an apparatus for vehicle guidance, comprising processing circuitry configured to determine a current value of a metric of a vehicle, compare the determined current value of the metric of the vehicle to an anticipated value of the metric of the vehicle, the anticipated value of the metric of the vehicle corresponding to a value of the metric of the vehicle along a predetermined route of the vehicle, receive, based upon the comparison, an input regarding an intended route of the vehicle, and generate guidance information based on the received input regarding the intended route of the vehicle.

According to an embodiment, the present disclosure further relates to a method of vehicle guidance, comprising determining a current lane-level position of a vehicle, comparing the determined current lane-level position of the vehicle to an anticipated lane-level position of the vehicle, the anticipated lane-level position of the vehicle corresponding to a lane-level position of the vehicle within a predetermined route of the vehicle, receiving, based upon the comparison, an input regarding an intended route of the vehicle, and generating, via processing circuitry, guidance information based on the received input regarding the intended route of the vehicle.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). Reference throughout this document to "one embodiment", "certain embodiments", "an embodiment", "an implementation", "an example" or similar terms means that a particular feature, structure, or characteristic described in connection with the embodiment is included in at least one embodiment of the present disclosure. Thus, the appearances of such phrases or in various places throughout this specification are not necessarily all referring to the same embodiment. Furthermore, the particular features, structures, or characteristics may be combined in any suitable manner in one or more embodiments without limitation.

Figure 1:
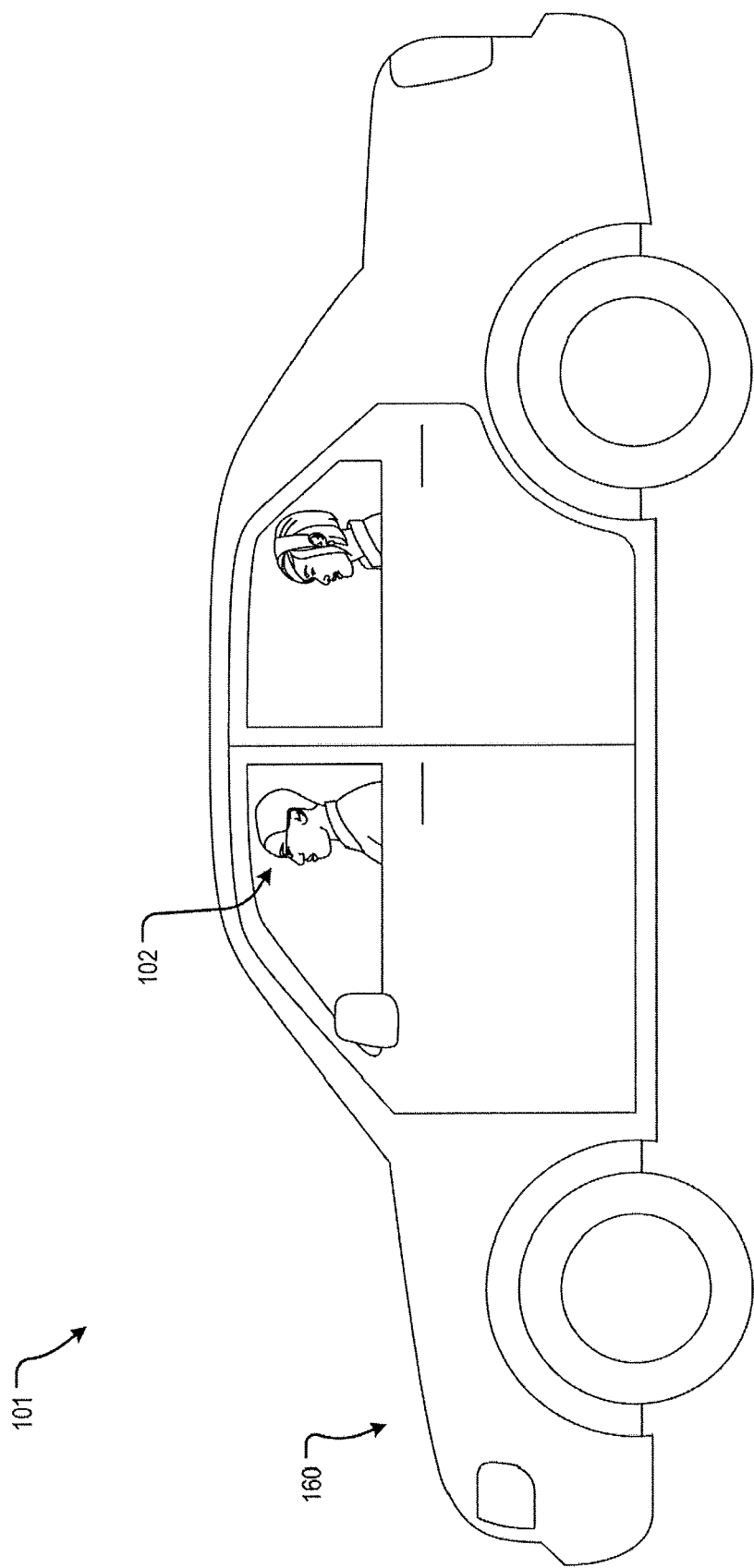
FIG. 1 is an illustration of an automotive vehicle, according to an exemplary embodiment of the present disclosure.

As introduction, it can be appreciated that benefits of the present disclosure may be realized within a vehicle 101, as shown in FIG. 1. The vehicle 101 may be a human-operated vehicle (i.e., at least partially operated by a driver 102), a semi-autonomous vehicle, or an autonomous vehicle, as appropriate. The vehicle 101 may include an electronics control unit (ECU) 160 comprising processing circuitry configured to perform the methods described herein. A more detailed description of the ECU 160 will be described below and, in particular, with reference to FIG. 8.

In an embodiment, the ECU 160 of the vehicle 101 may provide navigational guidance to the driver 102 of the vehicle. Navigational guidance may be provided integrally with the methods of the present disclosure or may be provided as part of a system including the methods of the present disclosure. In an example, the navigational guidance may be based on (1) locally stored navigational maps (e.g. high definition navigational maps) in conjunction with Global Navigation Satellite System-based (GNSS) (e.g., Global Positioning System (GPS)) coordinates of the vehicle or may be based on (2) remotely stored navigational maps in conjunction with GNSS-based coordinates of the vehicle, the ECU 160 of the vehicle 101 being in wireless communication with a remote server, or similar processing system, in order to provide position information of the vehicle to the server and to allow for an evaluation of a relative position of the vehicle. It can be appreciated that information processing, at least in the context of the present disclosure, is not limited to wired connections nor is it preferentially performed locally or remotely, suggesting a variety of modifications may be made to embodiments described herein without departing from the spirit of the invention.

In an embodiment, the above-described GNSS-based coordinates, in combination with highly defined and annotated navigational maps, may be sufficient to provide lane-level resolution of a position of the vehicle 101 of FIG. 1. It can be appreciated, however, that other lane-level detection methods may be used while remaining consistent with the spirit of the invention of the present disclosure. These lane-level detection methods include, among others, infrastructure-based approaches such as road-based electromagnetic coils for vehicle detection and camera-based approaches that perform vehicle tracking by identifying vehicles traversing specific regions of roadway.

Figure 2:
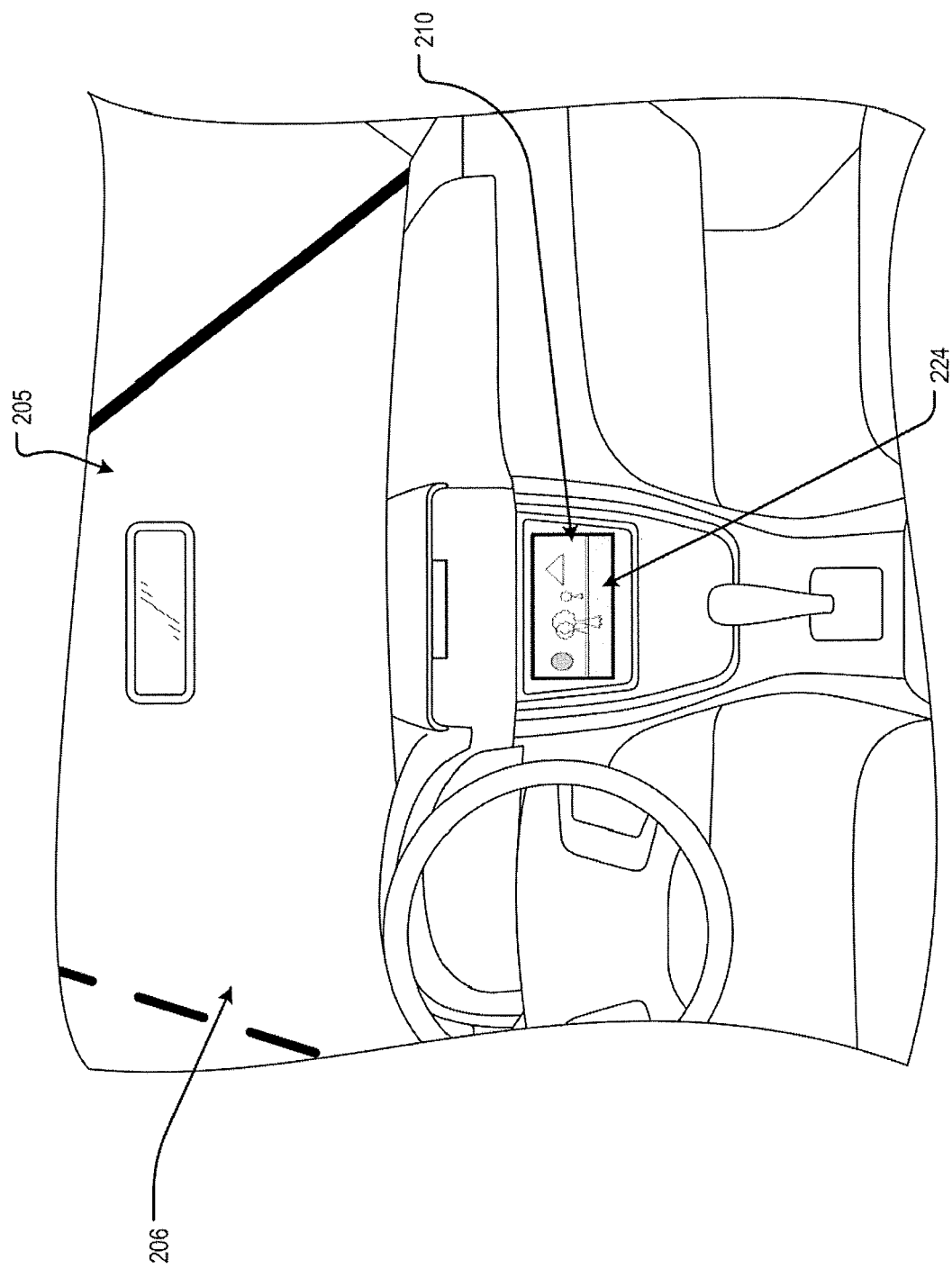
FIG. 2 is an illustration of a cabin of an automotive vehicle, according to an exemplary embodiment of the present disclosure.

According to an embodiment, navigational guidance employing the above can be provided within an environment of the vehicle 101, as shown in FIG. 2. FIG. 2 reflects a cabin of a vehicle. The navigational guidance can be provided to the driver of the vehicle via, among other methods, audio output, tactile and/or haptic output, and visual output via a navigational system 210. The navigational system 210 may include, in an example, a display or a display controllable by a driver, or other passenger, via indirect control (e.g. control knob) or via direct control (e.g. a touch screen display 224). In an embodiment, the driver or other passenger may communicate with the navigational system 210 by, in addition to others, voice control. As it relates to the present disclosure, the navigational system 210 may provide information regarding a roadway 205 and directional guidance in view of, at least, a current lane 206 of the vehicle.

Though navigational systems, such as those generally introduced above and implemented within vehicles, mobile devices, and the like, offer real-time guidance in the context of a position of a vehicle (or device) and relative to a predetermined route, these navigational systems are unable to discern driver intent and predict future actions of the driver. Instead, even when lane-level position information is available, current navigational systems are configured to passively wait for a navigational directive to be followed or missed, and a driver to stray from a predetermined route, before providing corrective directives re-routing the driver to the predetermined route or finding an alternative route to the destination.

Figure 3:
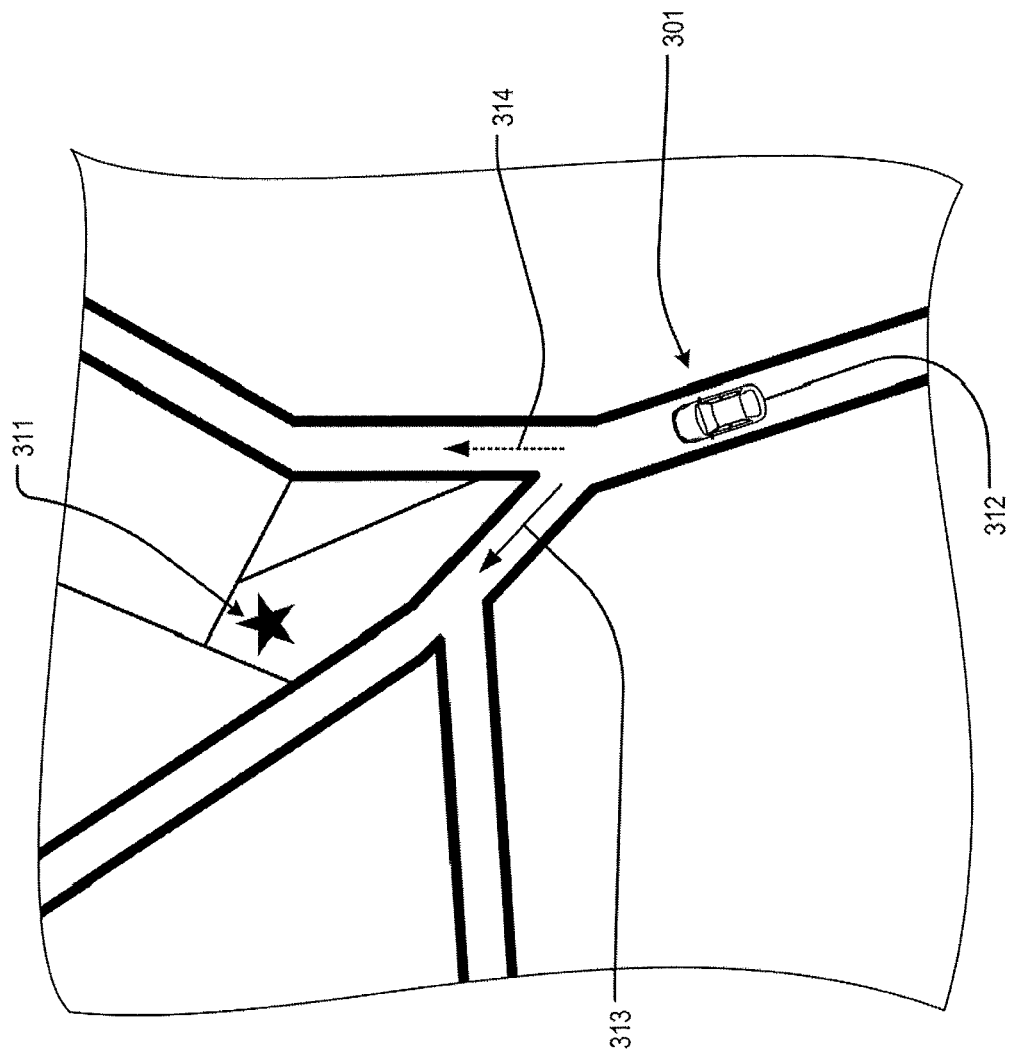
FIG. 3 is an illustration of a navigational map, according to an exemplary embodiment of the present disclosure.
Figure 4:
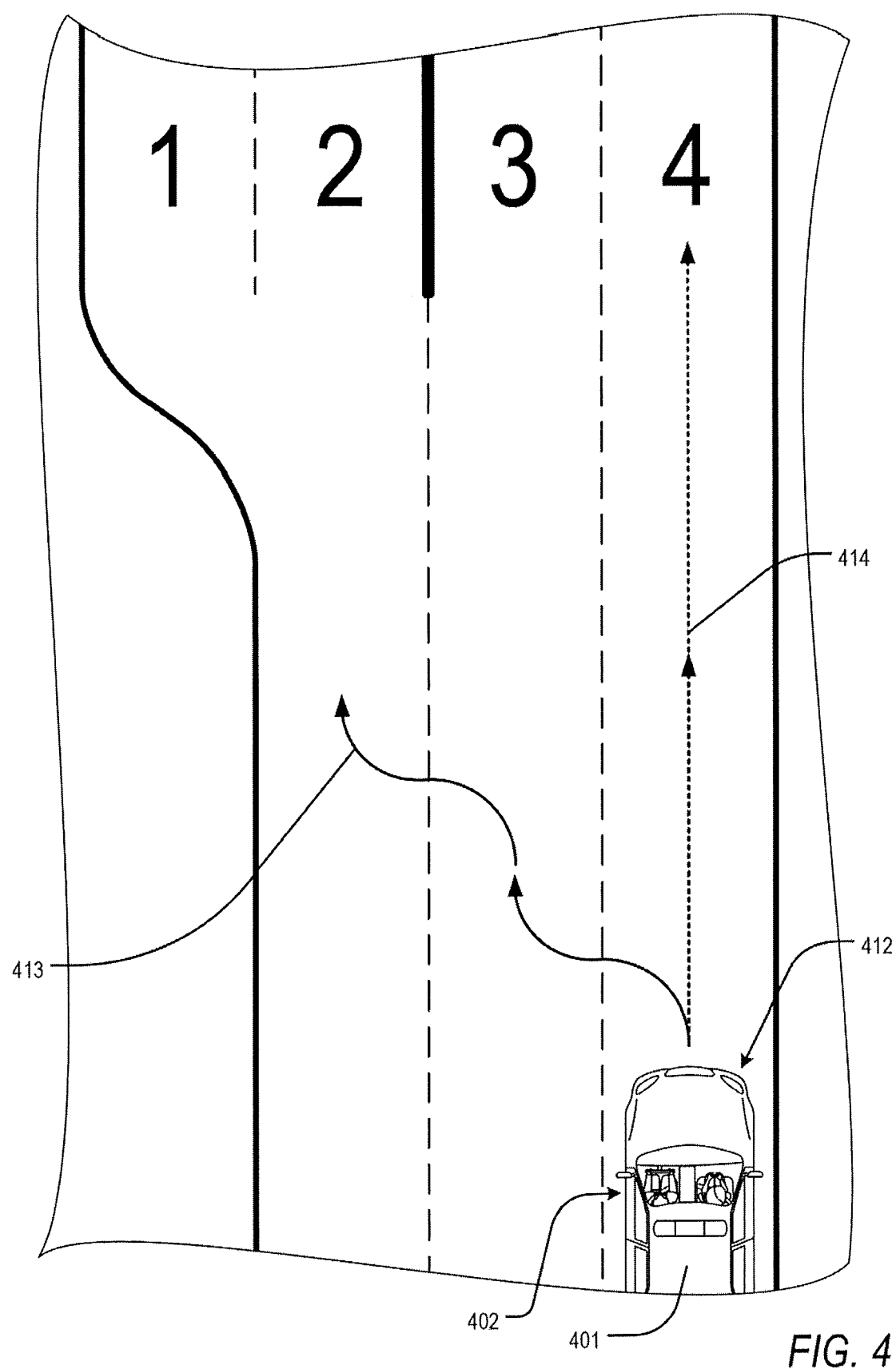
FIG. 4 is an illustration of route planning by a navigational system in view of lane position, according to an exemplary embodiment of the present disclosure.

Turning now to FIG. 3 and FIG. 4, the above shortcomings of current navigational systems are exemplified. With reference to FIG. 3, current navigational systems fail to recognize or predict that a predetermined route 313 is no longer a route desirable to a driver of a vehicle 301 or that the vehicle 301 is in a current position 312 relative to the predetermined route 313 that may lead them off of the predetermined route 313. In an example, the vehicle 301 may be traveling on a four-lane highway toward a destination 311 and, within the next quarter mile, may need to be in the leftmost lane in order to follow a fork in the road and merge onto a different highway consistent with the predetermined route 313. The driver of the vehicle 301, however, may currently be in the rightmost lane of the four-lane highway. As the navigational system is ignorant to the lane-level position of the vehicle 301, the navigational system cannot provide lane-level guidance to the driver of the vehicle 301. Moreover, the navigational system is unwise to a possible intended route 314 of the driver of the vehicle 314. Instead, the navigational system, expecting the driver of the vehicle 301 to follow the predetermined route 313, awaits a gross deviation from the predetermined route 313 before determining the vehicle to no longer be on the predetermined route 313 and to begin to accommodate the change in route. Among other issues, this delay in time between when the driver of the vehicle 301 may have decided to deviate from the predetermined route 313 and when the navigational system recognizes this intention may result in a 'missed turn' or other unexpected driving condition in which the driver of the vehicle 301 has deviated from the predetermined route 313 and must now wait for a route re-calculation.

With reference to FIG. 4, it may be the case that a navigational system can determine a lane-level position of a driver 402 of a vehicle 401. In this case, however, the navigational system may still fail to consider the possibility that the driver 402 does not intend to follow a predetermined route 413. For instance, it may be the case that the driver 402 of the vehicle 401 is traveling on a three-lane highway and, within the next half mile, needs to exit the highway in order to stay on the predetermined route 413. Notably, a current position 412 of the driver 402 of the vehicle 401 happens to be a rightmost lane (Lane 4) of the three-lane highway while the exit, within the next half mile, is located in a leftmost lane (Lane 2) of travel. It can be appreciated that, with proper guidance, the driver 402 of the vehicle 401 may still be able follow the predetermined route 413 expected by the navigational system. In such a case, the navigational system may provide appropriate instruction for the driver 402 of the vehicle 401 to change lanes two times to move to Lane 2. It can be appreciated, however, that the navigational system has failed to consider whether the driver 402 intends to follow the predetermined route 413. Instead, it may be that the driver 402 wishes to follow an alternate, intended route 414 aligned with Lane 4 (or Lane 3). Ignorant to this intention, the navigational system can only await the realization, following gross deviation of the vehicle 401 from the predetermined route 413, that the vehicle 401 is no longer on the predetermined route 413 and that an instruction has been 'missed'. It is only then that the navigational system begins to consider an alternate route for the driver 402 that may be more aligned with the intentions of the driver 402.

Therefore, as is the focus of the present disclosure, it is necessary to provide a method for navigational guidance, including determining that a driver does not intend to follow navigational directions, prompting the driver with an alert such as "Did you mean to travel (e.g. another, alternate route)?", and adjusting the navigational directions based on a response of the driver to the prompt. The alert can be provided preemptively so that the driver can comfortably follow any desired route of travel. As will be appreciated, such an approach is likely to result in a more comfortable experience for the driver and foster greater confidence in capabilities of the navigational system.

To this end, and according to an embodiment, the present disclosure describes a method for naturalistic routing with lane-level localization. Such naturalistic routing with lane-level localization offers earlier detection of current lane-level position and evaluation of driver intent, allowing for suggested routing to reflect the natural driving behavior of the driver. In an embodiment, estimated arrival times can also be considered in the determination of suggested, alternate routes.

Further to the above, the present disclosure describes, in an embodiment, a system implementing a method of determining a relative lane-level position of a vehicle and providing navigational guidance in view of possible travel routes. Implementing this method with a view to the time-dependency of vehicle travel allows the system to consider the current position of a vehicle, the anticipated position of the vehicle, and the intent of the driver as to adherence of a predetermined travel route or deviation therefrom.

The approach of the present disclosure may be further introduced with reference to the illustrations of FIG. 4. In an example, a driver 402 of a vehicle 401 may be understood to be traveling in Lane 4. The navigational system may understand the vehicle 401 needs to be in Lane 2 in order to follow a predetermined route 413 to a destination 411. Concurrently, the navigational system recognizes that, though there remains sufficient time for the vehicle 401 to move from a current position 412 to a position consistent with the predetermined route 413, the driver 402 may not intend to the follow the predetermined route 413. Proactively, the navigational system may query the driver 402 as to an intended route 414 of travel. For instance, the navigational system may query the driver 402 based on, inter alia, alternative routes available to the vehicle 401 to travel from the current position 412 to a destination and habitual routes traveled by the vehicle 401 or, more specifically, the driver 402 of the vehicle 401, on previous trips. The alternative routes may be determined in a manner similar to those determined by widely-available navigational systems and may consider, as an example, traffic flow patterns, congestion pricing, and the like. In response to the query, the driver 402 may indicate to the navigational system, by selection, an intended route 414 of the vehicle. In an embodiment, the driver 402 may respond to the query by indicating that the predetermined route 413 is desirable. In another embodiment, the driver 402 may respond to the query by indicating that an alternative route is the intended route 414. In any event, the navigational system may, response to input, provide guidance to the driver 402 in order to reach the destination. This is possible, in part, as a result of proactively and preemptively querying the driver to determine an intended route of the vehicle. This can be directly contrasted with previous approaches, described above, that rely on reactive realizations and modifications to travel route following an failed directive.

According to an embodiment, and as a supplement to the above, the navigational system may, in an example, store the query response within a database in order to analyze travel history and discern habits of the driver 402. This will be described in greater detail with reference to FIG. 6C.

Figure 5A:
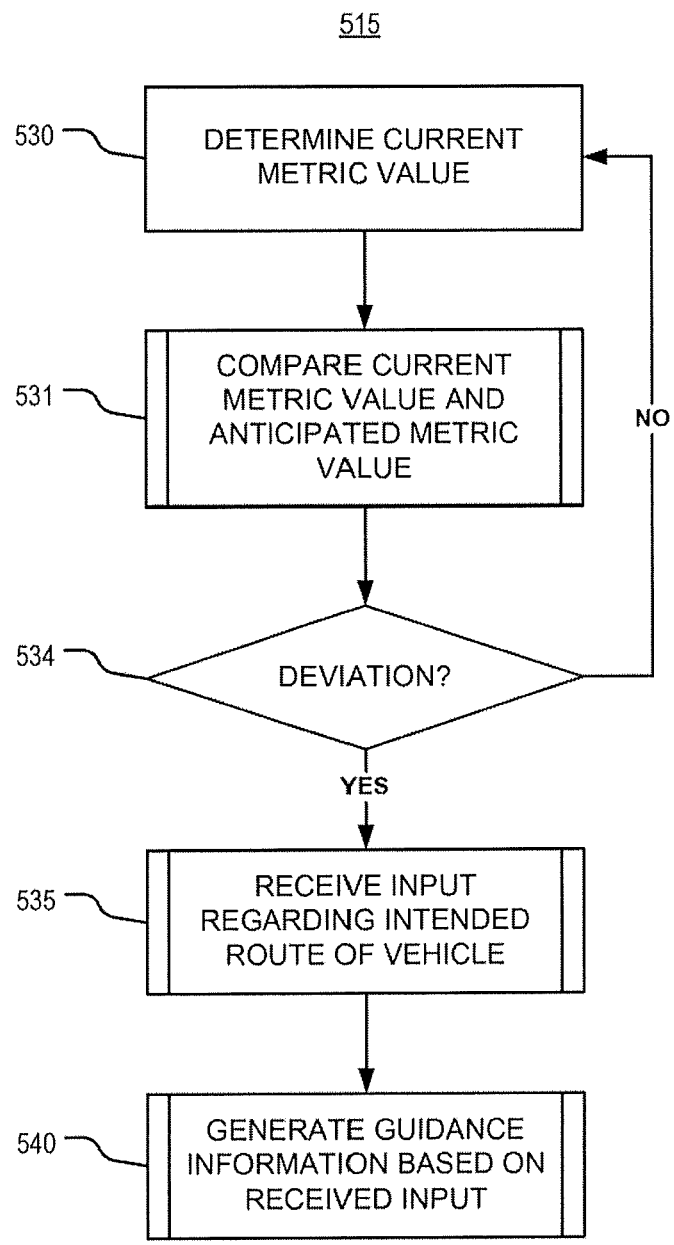
FIG. 5A is a flow diagram of a navigational system, according to an exemplary embodiment of the present disclosure.

The method of the present disclosure, exemplified in FIG. 4, will now be described generically with reference to FIG. 5A. The high level flow diagram of FIG. 5A represents the method of the present disclosure as performed, by the ECU of the vehicle, iteratively and during navigational guidance. In an embodiment, and as is the case in FIG. 5A, the method of the present disclosure may be performed in the context of any metric of the vehicle that may be reflective of an intent of a driver. For instance, though this metric of the vehicle is described above and below as being a 'lane-level position' of a vehicle, the metric can be any metric reflective of driver intent, including information processed and/or received as an input from audio devices, video devices, and other sensors integrated within the vehicle or peripherals thereof. In an example, the received information could be video data of head movements and facial expressions of a driver, wherein lack of head movement and facial expressions may indicate the driver has no intention of changing lanes to follow a predetermined route. In another example, the received information could be time-dependent data from vehicle sensors such as a speedometer, a speed or rate of change of speed of the vehicle possibly indicating intent of a driver, Determinations of driver intent, in context of the above examples of received information, could be made according to pattern recognition of such events.

Returning to FIG. 5A, the navigational guidance 515 of the present disclosure, as performed by the ECU of the vehicle, may begin with a determination of a current metric value of the vehicle (or the driver of the vehicle) at step 530. In an embodiment, process 515 is initiated following initiation of navigational guidance by the driver of the vehicle. The navigational guidance may provide driving direction along a predetermined route determined to be most time efficient in consideration of traffic and other factors.

According to an embodiment, the metric value may be a metric indicative of driver intent, as introduced above. The metric value may be based on vehicular data related to, among others, velocity, relative position, and time. In an example, the metric value may be based on a length of residence time of a vehicle within a specific lane. In another example, the metric value may be based on a vector of a trajectory of a vehicle describing a speed and direction of movement of the vehicle relative to a lane-level position.

At sub process 531 of process 515, the ECU may perform a comparison of the determined current metric value and an anticipated metric value. The sub process 531, described in detail with reference to FIG. 6A, may generate an error score between the determined current metric value and the anticipated metric value.

At step 534 of process 515, the error score may be compared to a predetermined threshold to evaluate the deviation. The predetermined threshold may be established according to historical data, and the like, demonstrating an error score at which driver intent can be reliably correlated.

If the error score does not achieve the predetermined threshold, process 515 may return to step 530 and continue to be iteratively performed by the ECU. Alternatively, if the error score does achieve the predetermined threshold, process 515 proceeds to sub process 535 and driver intent is discerned.

According to an embodiment, the historical data may be independent of the tendencies of an individual driver and, accordingly, the current metric value considered at step 534 of process 515 can be viewed relative to universal thresholds and baselines associated with the current metric value. For instance, if the current metric value is a vector indicating a vehicle is traveling from a leftmost lane to a rightmost lane, and an upcoming directive requires the vehicle to be in the leftmost lane, the method of the present disclosure may be initiated to determine if the driver intends to follow the predetermined route based on a comparison of the vector to universal thresholds reflecting actions of the average driver intending to follow the predetermined route.

According to an embodiment, the historical data may be dependent on tendencies of an individual driver and, accordingly, the current metric value can be considered at step 534 of process 515 in view of thresholds and baselines defined by actions of the driver during the current trip and/or during previous trips. For instance, the current metric value may be a residence time indicating a length of time a vehicle has been at a specific lane-level position. If a driver of a vehicle is in a leftmost lane for a prolonged period of time and a navigational directive indicates the vehicle should be in the rightmost lane in order to follow a predetermined route, this may potentially indicate a desire to stay in this lane-level position and follow an alternate route. The driver, however, may have a tendency, when compared with the average driver, to follow navigational directives at a distance and time closer to when the navigational directive must be followed. Accordingly, the method of the present disclosure may determine to delay querying the driver as to intent, as the driver is known to follow directives at the 'last minute'.

Having determined the error score to achieve the predetermined threshold, the ECU may configure a user interface to query the driver of the vehicle regarding an intended route of travel at sub process 535 of process 515. The query may include suggestions of alternative routes of travel based on time efficiency or historical data of the driver that may indicate habits or patterns, Sub process 535 will be described in greater detail with reference to FIG. 6B.

Having received a response to the query from the driver, guidance information can be generated at sub process 540 of process 515. At sub process 540 of process 515, the guidance information can be generated while, concurrently, the response to the query from the driver is analyzed and stored so that patterns and habit formation can be determined, thereby improving future navigational guidance.

Figure 5B:
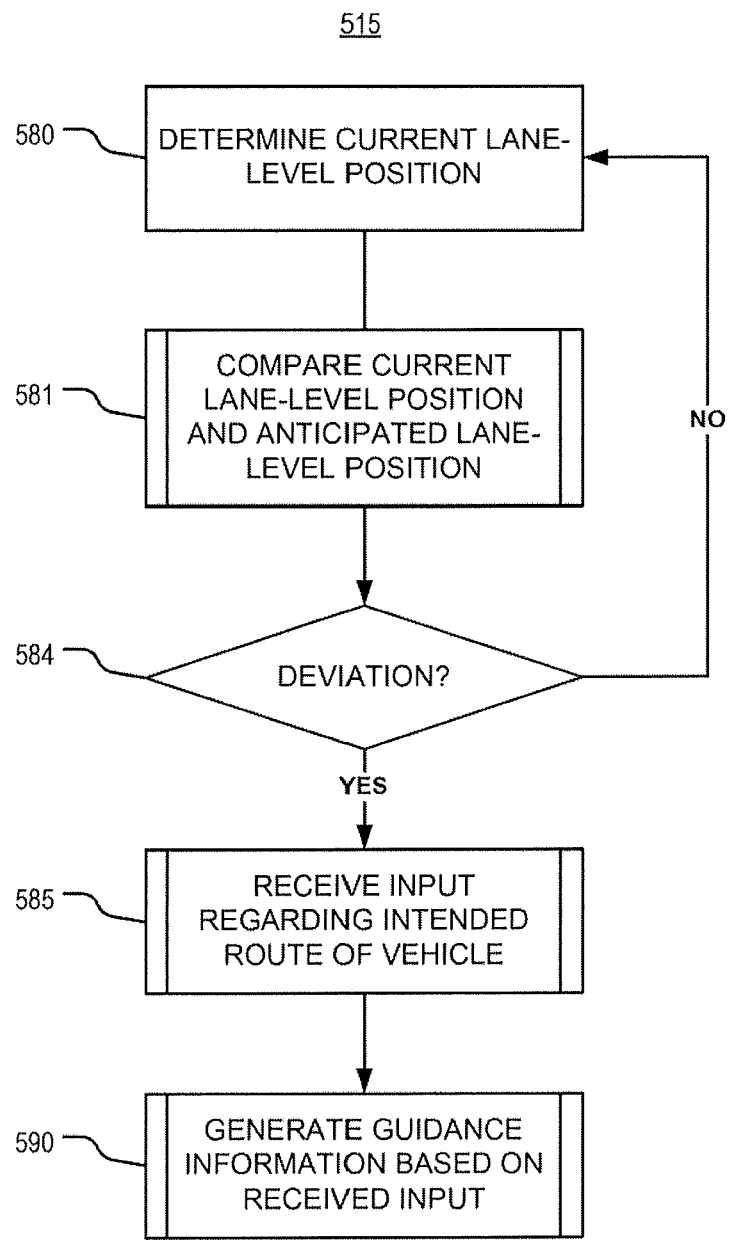
FIG. 5B is a flow diagram of a process of a navigational system, according to an exemplary embodiment of the present disclosure.

As noted above, the metric value of the vehicle can be any metric indicative of driver intent. As a specific example, FIG. 5B is a high level flow diagram of the method of the present disclosure wherein the metric value of the vehicle is the current lane-level position of the vehicle. In an embodiment, process 515 is initiated following initiation of navigational guidance by the driver of the vehicle. The navigational guidance may provide driving direction along a predetermined route determined to be most time efficient in consideration of traffic and other factors.

At step 580 of process 515, navigational guidance, as performed by the ECU of the vehicle, may begin with a determination of a current lane-level position of the vehicle.

At sub process 581 of process 515, the ECU may perform a comparison of the determined current lane-level position and an anticipated lane-level position. The sub process 581, described in detail with reference to FIG. 6A, may generate an error score between the determined current lane-level position and the anticipated lane-level position.

At step 584 of process 515, the error score may be compared to a predetermined threshold to evaluate the deviation of the vehicle from the predetermined route. The predetermined threshold may be established according to historical data, and the like, demonstrating an error score at which driver intent can be reliably correlated. If the error score does not achieve the predetermined threshold, process 515 may return to step 580 and continue to be iteratively performed by the ECU. Alternatively, if the error score does achieve the predetermined threshold, process 515 proceeds to sub process 585 and driver intent is discerned.

At sub process 585 of process 515, described in detail with reference to FIG. 6B, the ECU may configure a user interface to query the driver of the vehicle regarding an intended route of travel. The query may include suggestions of alternative routes of travel based on time efficiency or historical data of the driver that may indicate habits or patterns.

Having received a response to the query from the driver, guidance information can be generated at sub process 590 of process 515. At sub process 590 of process 515, the guidance information can be generated while, concurrently, the response to the query from the driver is analyzed and stored so that patterns and habit formation can be determined, thereby improving future navigational guidance.

Figure 6A:
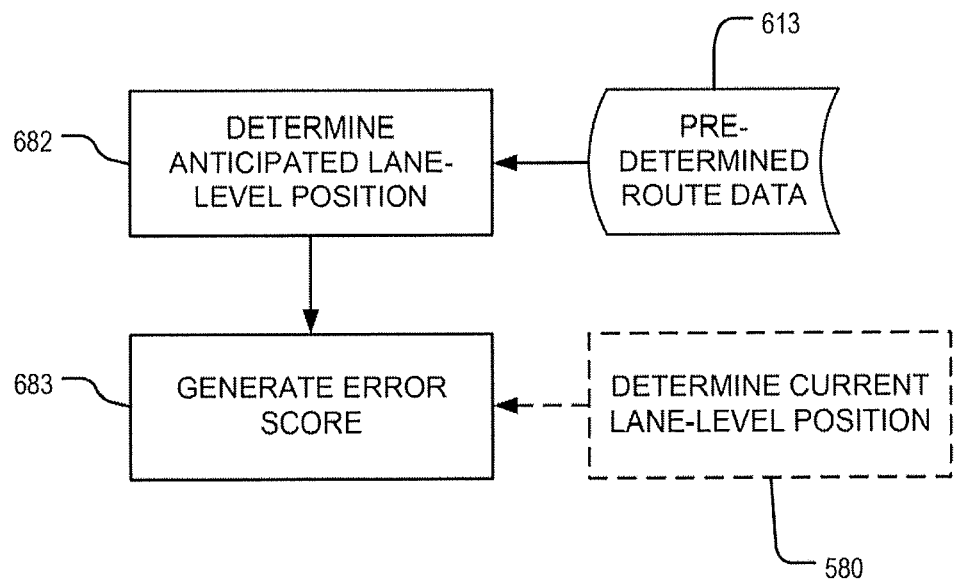
FIG. 6A is a flow diagram of a sub process of a process of a navigational system, according to an exemplary embodiment of the present disclosure.

Sub process 581, wherein a comparison of a determined current lane-level position of the vehicle and an anticipated lane-level position of the vehicle is performed, is further described with reference to FIG. 6A.

At step 682 of sub process 581, the anticipated lane-level position of the vehicle may be determined based on predetermined route data gathered at step 613. In an example, if a right hand turn is an anticipated action of the vehicle, the anticipated lane-level position may be the rightmost lane of travel of the roadway.

At step 683 of sub process 581, an error score is generated based on the determined anticipated lane-level position of the vehicle and the current lane-level position of the vehicle determined at step 580 of process 515. The generated error score may reflect the level of disagreement between the two lane-level positions of the vehicle.

The generated error score may then be evaluated relative to a predetermine threshold to determine if the level of disagreement between the anticipated lane-level position of the vehicle and the current lane-level position of the vehicle is significant. If the error score achieves the predetermined threshold, process 515 proceeds to sub process 585, as shown in FIG. 6B.

At step 686 of sub process 585, and responsive to the determination that the driver may not intend to follow the predetermined route, the ECU of the vehicle may determine alternate routes to the destination based on the determined current lane-level position. The determined alternate routes may be based on alternate route data gathered at step 687 and data gathered from a historical database 617, the historical database 617 including habitual data. The alternate route data may include route data from standard navigational guidance, each route configured to provide options to the driver optimizing time, distance traveled, and/or tolls paid between the current lane-level position of the vehicle and the destination. In an embodiment, the historical data may be a corpus of previous trip data including route data from previous trips made by the vehicle to the destination from the current lane-level position. In this way, the corpus of previous trip data can be analyzed to identify habits and patterns of travel of the vehicle (i.e. habitual data) and in order to provide suggested alternate route data to a driver of the vehicle. In another embodiment, the historical data may include route data from previous trips made by a specific driver and can include identifiable tendencies of the specific driver that arise during a trip. For instance, the historical data may include a corpus of previous trip data that may be analyzed to identify habits and patterns including, among others, particular routes, independent of length of travel time, preferred by the driver and particular routes preferable to the driver on specific days of the week, such as weekdays. These habits can be used to provide alternate routes to the driver of the vehicle reflecting possible intended routes of the driver.

In an embodiment, the historical database 617 may include global route data collected from other drivers who have traveled the same route. The global route data may be collected from other drivers and may be stored within the historical database 617 such that the ECU of the vehicle may provide alternate routes based on prior actions of other drivers traveling between the same or similar origin and destination. For instance, it may be that, in the absence of sufficient historical data from the current driver from which to derive habitual behavior, or as complementary information thereto, the ECU of the vehicle may access the historical database 617 and analyze historical data from other drivers to determine if habitual behavior exists, globally, and if and how this habitual behavior deviates from guidance which may be traditionally provided by a navigation system at step 687. The ECU of the vehicle may also analyze the historical data to determine if travel trends exist across a global dataset. In an example, it may be that alternate route data gathered at step 687 and global route data collected from the historical database 617 indicate that a majority of drivers, globally, ignore primary guidance of the alternate route data and, instead, follow a secondary route not originally provided by a navigation system. Accordingly, the ECU of the vehicle may consider this habitual behavior (i.e., the secondary route) in providing alternate routes to a driver of the vehicle.

It can be appreciated that the global route data may be gathered via wireless communication with a remote server storing the historical database 617, may be stored within a local historical database 617 accessible directly by the ECU of the vehicle, or may be acquired via vehicle-to-vehicle or vehicle-to-infrastructure communication. Moreover, in the case of vehicle-to-vehicle communication, the above-described global route data may be regional route data gathered from surrounding vehicles traveling the same route. Analyzing regionally-available data reduces computational burdens by limiting data processing to likely-relevant data.

Having determined alternate routes at step 686 of sub process 585, the ECU may configure a user interface to query the driver regarding the intended route of the vehicle at step 688 of sub process 585. The query to the driver may be in the form of an audio question, a visual question, or other mode of inquiry such that the driver may respond, in kind, with a selection indicating an intended route of the vehicle.

This input can be received by the ECU, at step 689 of sub process 585, as a reflection of intent of the driver. The received input can be provided by, among others, voice command, haptic control via touch screen of a user interface or control knob of a control panel, and specific facial muscle movements or other distinct facial features. In an embodiment, the received input may be an indication that the driver wishes to follow the predetermined route of the vehicle. Similarly, in another embodiment, the received input may be an indication that the driver wishes to follow one of the alternate routes identified by the ECU as a possible intended route. By performing the analysis preemptively and with adequate time for the driver to comfortably navigate the vehicle to the desired route, the method of the present disclosure allows for navigation to either the predetermined route or an alternate route and avoids reactive re-calculation of travel routes in response to a missed direction.

Having received an indication of the intended route of the driver at step 689 of sub process 585, process 515 may proceed to sub process 590, described with reference to FIG. 6C. At step 693 of sub process 590, guidance information for the intended route of the vehicle can be provided based on the input received at sub process 685 of process 515. The received input identifies the intended route data that may be gathered at step 694 of sub process 590, wherein the gathered intended route data is either the predetermined route or one of a plurality of alternate routes. The intended route data can include navigational guidance required for subsequent travel to the destination. The gathered intended route data can then be conveyed to the driver at step 695, as described in FIG. 7.

Figure 6B:
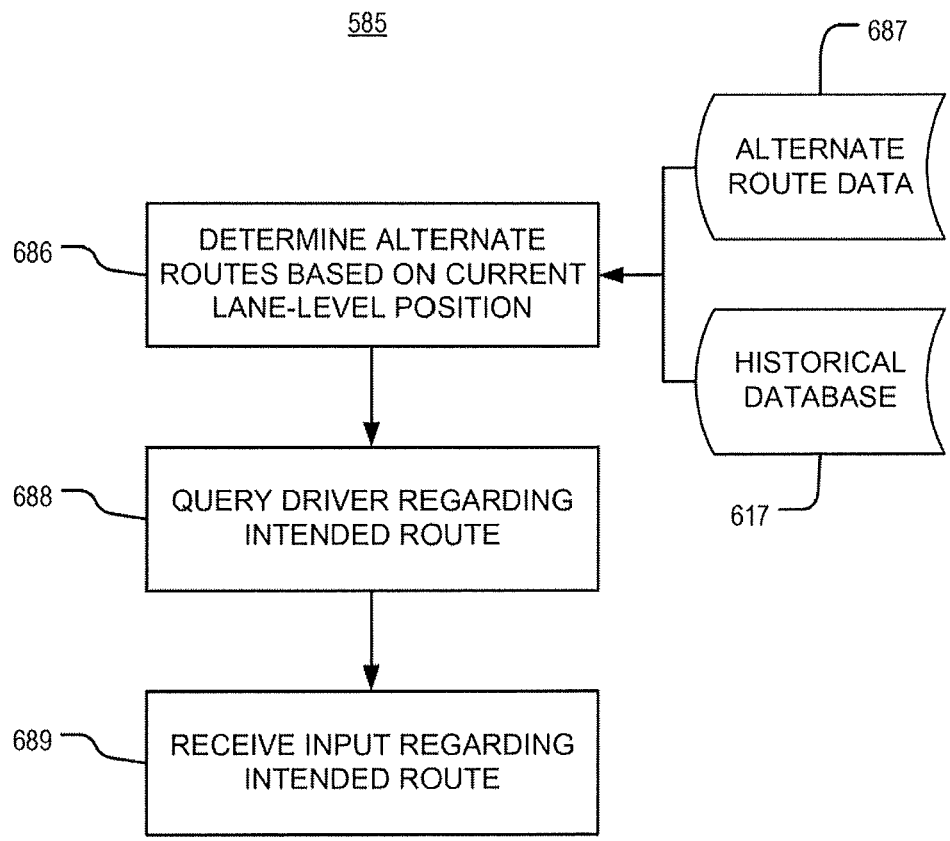
FIG. 6B is a flow diagram of a sub process of a process of a navigational system, according to an exemplary embodiment of the present disclosure.
Figure 6C:
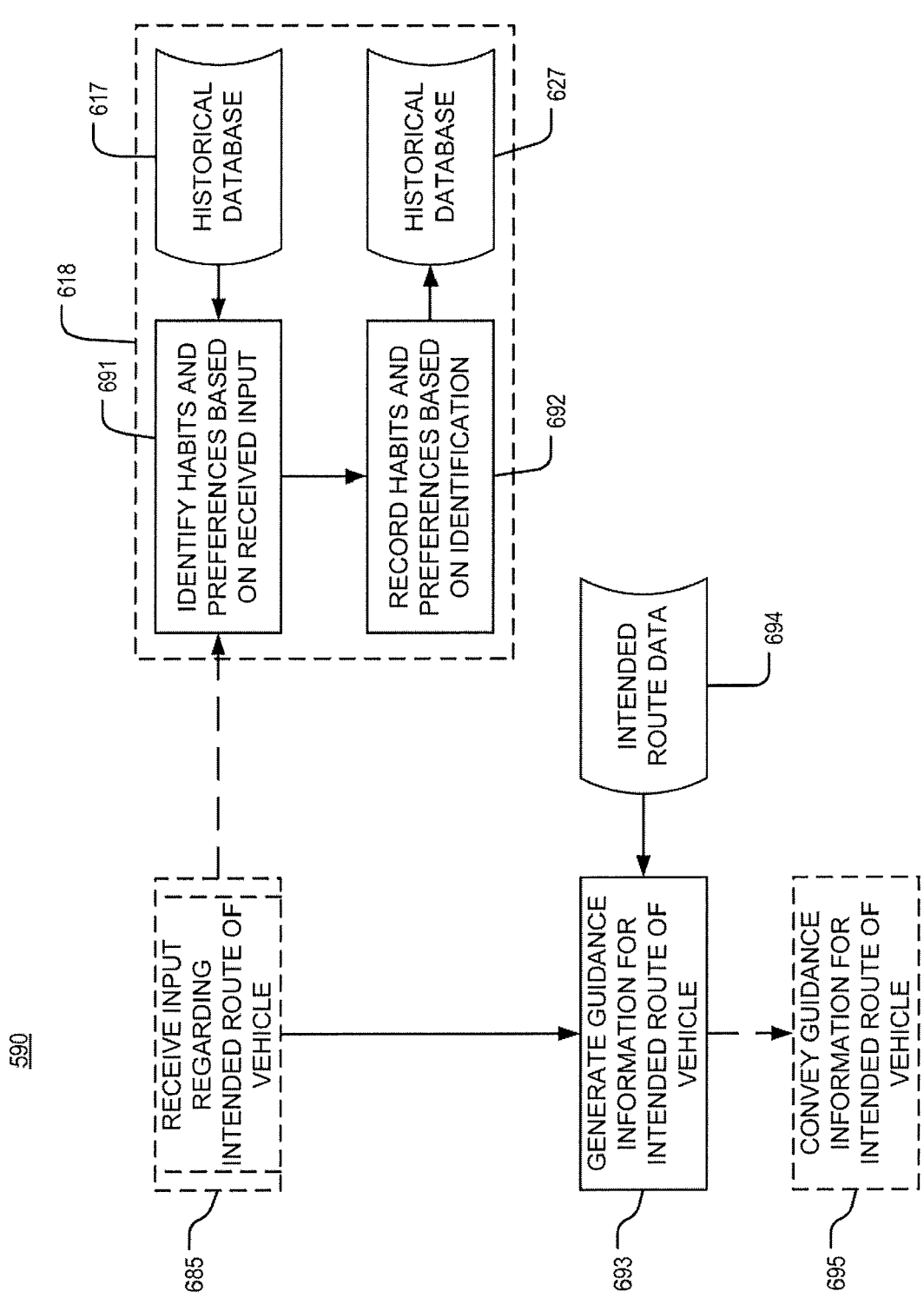
FIG. 6C is a flow diagram of a sub process of a process of a navigational system, according to an exemplary embodiment of the present disclosure.

According to an embodiment, sub process 585 of process 515 of FIG. 6B provides a query to a driver of a vehicle based on alternate route data and historical data associated with the driver (or the vehicle) that may include data indicative of a habit of the driver. For instance, the habit may be a tendency of the driver to travel at a speed above the speed limit and dramatically follow navigational directives at a rate of speed higher than that typically done by an average driver. To this end, sub system 618 of FIG. 6C includes steps to supplement the historical data and identify habits and patterns of a driver that may improve the intelligence of the method of the present disclosure in identifying intentions of the driver. At step 691 of sub system 618, the selection received from the driver of the intended route can be used in combination with historical data gathered from a historical database 617 to identify habits and preferences of the driver at step 691 of sub system 618. The labeled data provided by the selection of the driver can be directly compared with and evaluated in the context of the historical data 617. Subsequently, the received, identified input of the driver can be stored in an updated historical database 627 at step 692, the received, identified input then being annotated according to habits and preferences identified. The updated historical database 627 may then be available during further instances of the method of the present disclosure.

It can be appreciated that sub system 618 may be performed outside of the process of 515, thereby justifying the hashed nature of the arrow connecting sub process 685 of process 515 to sub system 618.

According to an embodiment, the updated historical database 627 may include sufficient historical data such that pre-determined route data may be based on sub process 618, in an example, the pre-determined route data being based on habitual behavior of a driver or of a globally-referenced driver, Therefore, an intended route determined from habitual behavior may be provided as the pre-determined route, thereby obviating the need for interaction with the driver of the vehicle after having provided a traditional route as the pre-determined route. To this end, intended routes, or preferred routes, of the driver can be learned from the historical data and, with reference to FIG. 6A, the pre-determined route data of step 613 can be based on the learned, intended routes of the driver. It can be appreciated that, as described in the flow diagrams of FIG. 5A through FIG. 6C, a learned, intended route of a driver provided as the pre-determined route may then be evaluated, as would a traditionally-provided pre-determined route, to determine if the learned, intended route, or pre-determined route, remains the desired route of the driver.

Figure 7:
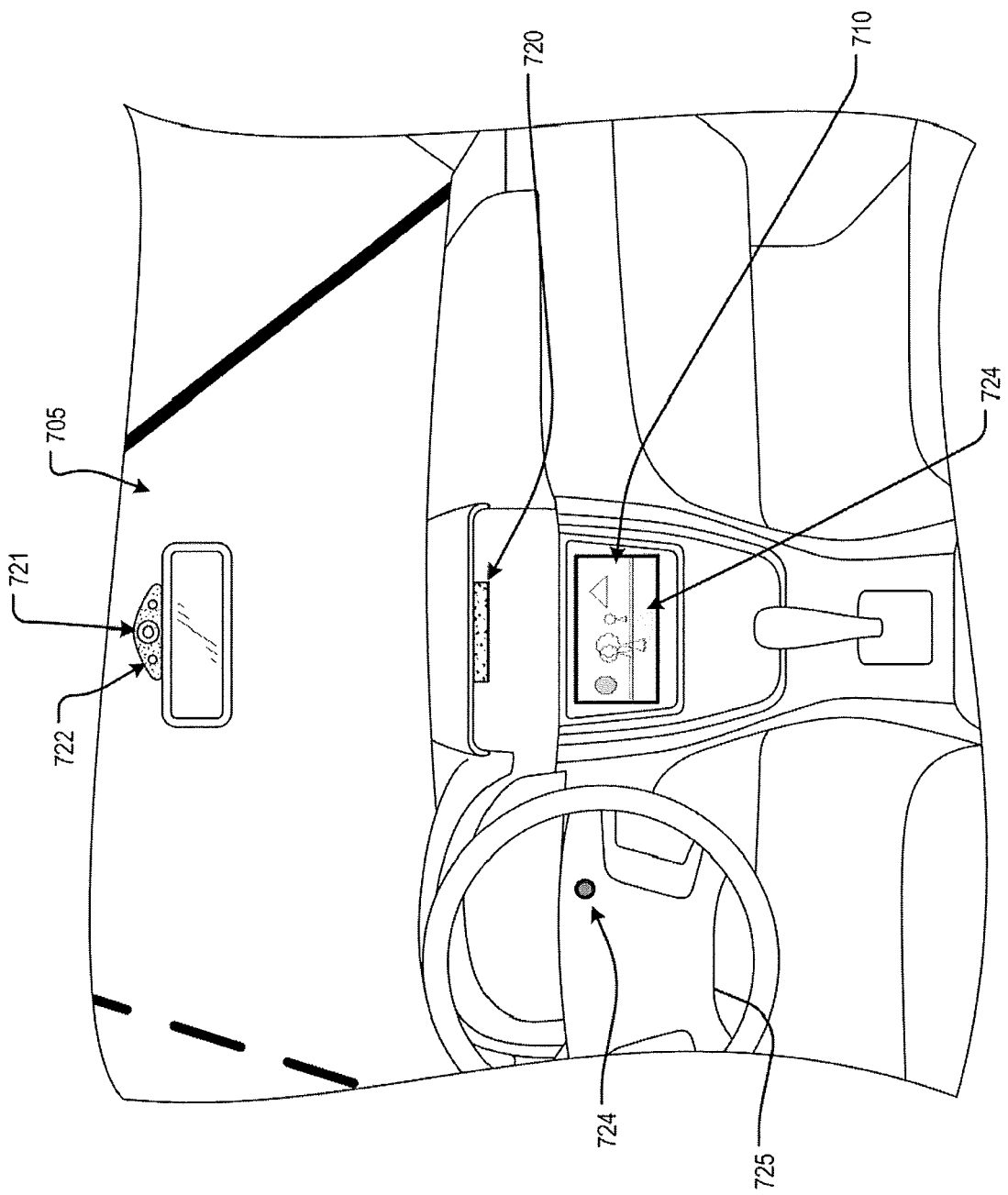
FIG. 7 is an illustration of a user interface of a navigational system of an automotive vehicle, according to an exemplary embodiment of the present disclosure.

With reference again to FIG. 6C, the guidance information conveyed at step 695 of sub process 590 can be conveyed to the driver of the vehicle by a variety of means. With reference to FIG. 7, an illustration of a front cabin of a vehicle, the guidance information regarding a roadway 705 can be provided to a driver of the vehicle via a navigational system 710. The navigational system 710 can include a display or touch screen display 724 in addition to a speaker 722. A heads up display, disposed above a steering wheel 725, may also be integrated within the navigational system 710 to provide enhanced comfort to the driver of the vehicle.

According to an embodiment and with reference to sub process 585 of process 515, the driver of the vehicle (or a passenger of the vehicle) may respond to a query from the navigational system 710 by interaction with the navigational system 710. For instance, the driver may respond by, among others, manipulating a control knob 724 on the steering wheel 725 of the vehicle, interacting with the touch screen display 724 of the navigational system, speaking into a microphone 720 to provide a voice command, and using body motions to indicate to a camera 721 a response.

Figure 8:
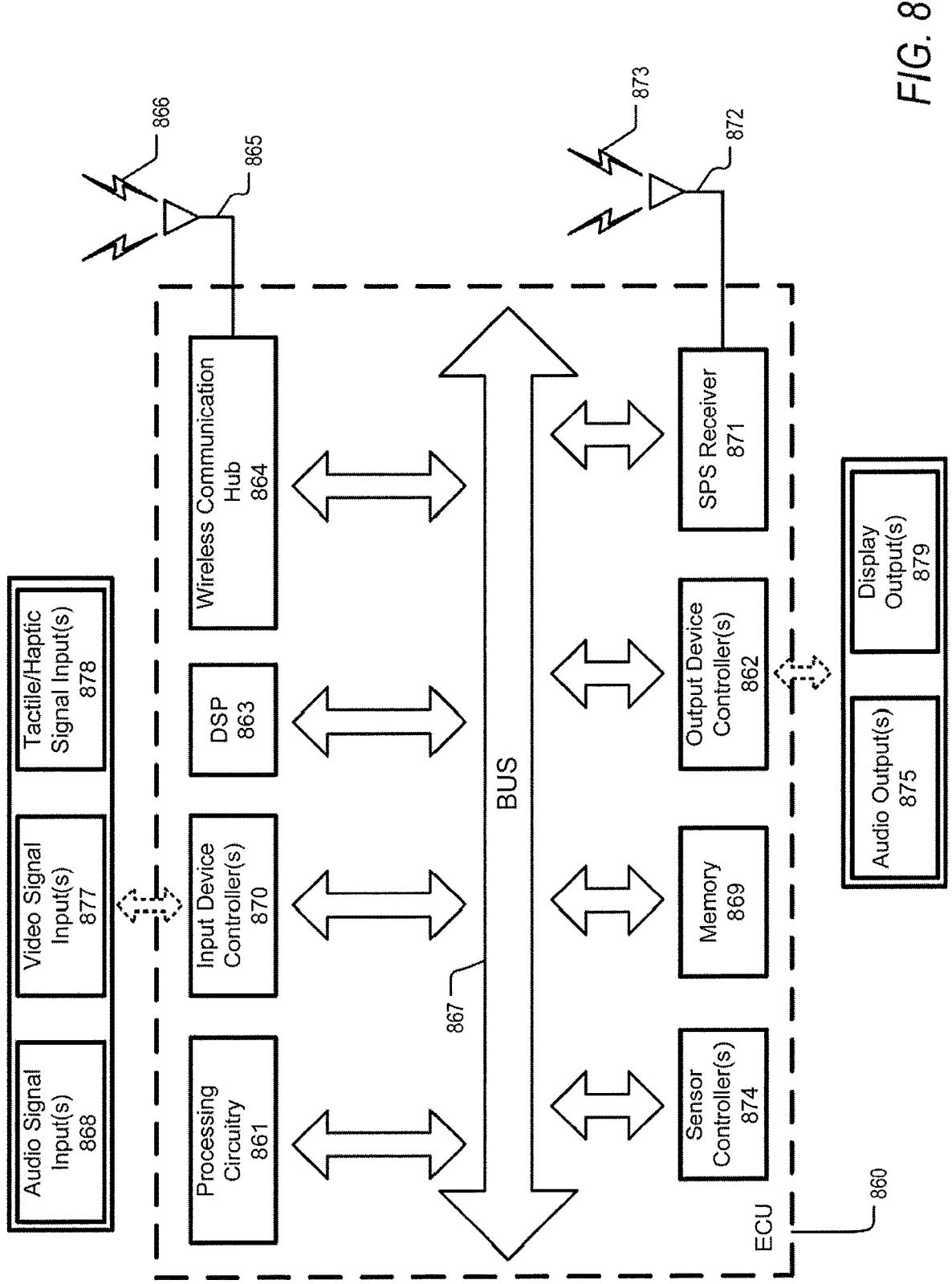
FIG. 8 is a schematic of a hardware configuration of an automotive vehicle employing a navigational system, according to an exemplary embodiment of the present disclosure.

FIG. 8 is a schematic of hardware components of an exemplary embodiment of an automotive vehicle and an electronics control unit (ECU) 860 that may be implemented in order to perform the methods of the present disclosure. It should be noted that FIG. 8 is meant only to provide a generalized illustration of various components, any or all of which may be utilized as appropriate. It can be noted that, in some instances, components illustrated by FIG. 8 can be localized to a single physical device and/or distributed among various networked devices, which may be disposed at different physical locations. Moreover, it can be appreciate that, in an embodiment, the ECU 860 can be configured to process data (i.e. audio signal(s), video signal(s), haptic signal(s)) and control operation of the navigational system. In another embodiment, the ECU 860 can be configured to be in communication with remote processing circuitry configured to, in coordination with the ECU 860, process data and control operation of the navigational system. The remote processing circuitry may be a centralized server or other processing circuitry separate from the ECU 860 of the vehicle. The ECU 860 is shown comprising hardware elements that can be electrically coupled via a BUS 867 (or may otherwise be in communication, as appropriate). The hardware elements may include processing circuitry 861 which can include without limitation one or more processors, one or more special-purpose processors (such as digital signal processing (DSP) chips, graphics acceleration processors, application specific integrated circuits (ASICs), and/or the like), and/or other processing structure or means. The above-described processors can be specially-programmed to perform operations including, among others, image processing and data processing. Some embodiments may have a separate DSP 863, depending on desired functionality.

According to an embodiment, the ECU 860 can include one or more input device controllers 870, which can control without limitation an in-vehicle touch screen display, heads up display, a touch pad, microphone, button(s), dial(s), switch(es), camera(s), and/or the like. In an embodiment, one of the one or more input device controllers 870 can be configured to control a microphone and can be configured to receive audio signal input(s) 868 as a response from a driver of a vehicle. In an embodiment, one of the one or more input device controllers 870 can be configured to control a touch screen display or heads up display and can be configured to receive tactile/haptic signal input 878 from the driver of the vehicle via the touch screen display or other tactile and/or haptic user interface. In an embodiment, one of the one or more input device controllers 870 can be configured to control a camera and can be configured to receive video signal input(s) 877 as a response from the driver of the vehicle. Accordingly, the processing circuitry 861 of the ECU 860 may execute processes of the navigational system in response to the received input(s).

According to an embodiment, the ECU 860 can also include one or more output device controllers 862, which can control without limitation a display, a visual indicator such as an LED, speakers, and the like. For instance, the one or more output device controllers 862 can be configured to control audio outputs) 875 of the speakers of a vehicle such that queries and navigational guidance can be provided to a driver. In addition, the one or more output device controllers 862 can be configured to control a display output(s) 879 such as a touch screen display or a heads up display, the display output(s) 879 conveying a query or navigational guidance to the driver.

The ECU 860 may also include a wireless communication hub 864, or connectivity hub, which can include without limitation a modem, a network card, an infrared communication device, a wireless communication device, and/or a chipset (such as a Bluetooth device, an IEEE 802.11 device, an IEEE 802.16.4 device, a WiFi device, a WiMax device, cellular communication facilities including 4G, 5G, etc.), and/or the like. The wireless communication hub 864 may permit data to be exchanged with, as described, in part, a network, wireless access points, other computer systems, and/or any other electronic devices described herein. The communication can be carried out via one or more wireless communication antenna(s) 865 that send and/or receive wireless signals 866.

Depending on desired functionality, the wireless communication hub 864 can include separate transceivers to communicate with base transceiver stations (e.g., base stations of a cellular network) and/or access point(s). These different data networks can include various network types. Additionally, a Wireless Wide Area Network (WWAN) may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a WiMax (IEEE 802.16), and so on. A CDMA network may implement one or more radio access technologies (RATS) such as cdma2000, Wideband-CDMA (W-CDMA), and so on. Cdma2000 includes IS-95, IS-2000, and/or IS-856 standards. A TDMA network may implement Global System for Mobile Communications (GSM), Digital Advanced Mobile Phone System (D-AMPS), or some other RAT. An OFDMA network may employ LTE, LTE Advanced, and so on, including 4G and 5G technologies.

The ECU 860 can further include sensor controller(s) 874. Such controllers can control, without limitation, one or more sensors of the vehicle, including, among others, one or more accelerometer(s), gyroscope(s), camera(s), radar(s), LiDAR(s), odometric sensor(s), and ultrasonic sensor(s), as well as magnetometer(s), altimeter(s), microphone(s), proximity sensor(s), light sensor(s), and the like.

Embodiments of the ECU 860 may also include a Satellite Positioning System (SPS) receiver 871 capable of receiving signals 873 from one or more SPS satellites using an SPS antenna 872. The SPS receiver 871 can extract a position of the device, using various techniques, from satellites of an SPS system, such as a global navigation satellite system (GNSS) (e.g., Global Positioning System (GPS)), Galileo over the European Union, GLObal NAvigation Satellite System (OLONASS) over Russia, Quasi-Zenith Satellite System (QZSS) over Japan, Indian Regional Navigational Satellite System (IRNSS) over India, Compass/BeiDou over China, and/or the like. Moreover, the SPS receiver 871 can be used by various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MEAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS.

The ECU 860 may further include and/or be in communication with a memory 869. The memory 869 can include, without limitation, local and/or network accessible storage, a disk drive, a drive array, an optical storage device, a solid-state storage device, such as a random access memory (° RAM"), and/or a read-only memory ("ROM"), which can be programmable, flash-updateable, and/or the like. Such storage devices may be configured to implement any appropriate data stores, including without limitation, various file systems, database structures, and/or the like.

The memory 869 of the ECU 860 also can comprise software elements (not shown), including an operating system, device drivers, executable libraries, and/or other code embedded in a computer-readable medium, such as one or more application programs, which may comprise computer programs provided by various embodiments, and/or may be designed to implement methods, and/or configure systems, provided by other embodiments, as described herein. In an aspect, then, such code and/or instructions can be used to configure and/or adapt a general purpose computer (or other device) to perform one or more operations in accordance with the described methods, thereby resulting in a special-purpose computer.

Obviously, numerous modifications and variations are possible in light of the above teachings. It is therefore to be understood that within the scope of the appended claims, the invention may be practiced otherwise than as specifically described herein.

Embodiments of the present disclosure may also be as set forth in the following parentheticals.

(1) A method of vehicle guidance, comprising determining a current value of a metric of a vehicle, comparing the determined current value of the metric of the vehicle to an anticipated value of the metric of the vehicle, the anticipated value of the metric of the vehicle corresponding to a value of the metric of the vehicle along a predetermined route of the vehicle, receiving, based upon the comparison, an input regarding an intended route of the vehicle, and generating, via processing circuitry, guidance information based on the received input regarding the intended route of the vehicle.

(2) The method according to (1), wherein the received input regarding the intended route of the vehicle includes an indication of whether a driver of the vehicle desires to deviate from the predetermined route of the vehicle.

(3) The method according to either (1) or (2), wherein the receiving the input regarding the intended route of the vehicle includes determining alternate routes between a current position of the vehicle and a destination of the vehicle based on the determined current value of the metric of the vehicle.

(4) The method according to any of (1) to (3), wherein the comparing the determined current value of the metric of the vehicle to the anticipated value of the metric of the vehicle includes generating an error score of the determined current value of the metric of the vehicle and the anticipated value of the metric of the vehicle, and comparing the generated error score to a predetermined error score threshold.

(5) The method according to any of (1) to (4), wherein the determined anticipated value of the metric of the vehicle is based on a habit associated with a driver of the vehicle, the habit including a driving pattern of the driver of the vehicle identified within historical data associated with the driver, the historical data associated with the driver being stored within a historical database.

(6) The method according to any of (1) to (5), wherein the generating the guidance information based on the received input regarding the intended route of the vehicle includes identifying a driving pattern of a driver of the vehicle based on the received input regarding the intended route of the vehicle and historical data associated with the driver of the vehicle, the received input being associated with the determined current value of the metric of the vehicle, wherein each entry of the historical data associated with the driver includes the received input regarding the intended route of the vehicle, the determined current value of the metric of the vehicle, the anticipated value of the metric of the vehicle, and a corresponding geolocation of the vehicle.

(7) The method according to any of (1) to (6), wherein the generating the guidance information based on the received input regarding the intended route of the vehicle includes recording the identified driving pattern of the driver of the vehicle within the historical data associated with the driver of the vehicle.

(8) The method according to any of (1) to (7), wherein the metric of the vehicle includes a vector of a trajectory of the vehicle.

(9) The method according to any of (1) to (8), wherein the generating the guidance information based on the received input regarding the intended route of the vehicle includes conveying the generated guidance information to a driver of the vehicle by one or more of audio and video.

(10) An apparatus for vehicle guidance, comprising processing circuitry configured to determine a current value of a metric of a vehicle, compare the determined current value of the metric of the vehicle to an anticipated value of the metric of the vehicle, the anticipated value of the metric of the vehicle corresponding to a value of the metric of the vehicle along a predetermined route of the vehicle, receive, based upon the comparison, an input regarding an intended route of the vehicle, and generate guidance information based on the received input regarding the intended route of the vehicle.

(11) The apparatus according to (10), wherein the received input regarding the intended route of the vehicle includes an indication of whether a driver of the vehicle desires to deviate from the predetermined route of the vehicle.

(12) The apparatus according to either (10) or (11), wherein, prior to receipt of the input regarding the intended route of the vehicle, the processing circuitry is further configured to determine alternate routes between a current position of the vehicle and a destination of the vehicle based on the determined current value of the metric of the vehicle.

(13) The apparatus according to any of (10) to (12), wherein, in order to compare the determined current value of the metric of the vehicle to the anticipated value of the metric of the vehicle, the processing circuitry is further configured to generate an error score of the determined current value of the metric of the vehicle and the anticipated value of the metric of the vehicle, and compare the generated error score to a predetermined error score threshold.

(14) The apparatus according to any of (10) to (13), wherein the determined anticipated value of the metric of the vehicle is based on a habit associated with a driver of the vehicle, the habit including a driving pattern of the driver of the vehicle identified within historical data associated with the driver, the historical data associated with the driver being stored within a historical database.

(15) The apparatus according to any of (10) to (14), wherein, in order to generate the guidance information based on the received input regarding the intended route of the vehicle, the processing circuitry is further configured to identify a driving pattern of a driver of the vehicle based on the received input regarding the intended route of the vehicle and historical data associated with the driver of the vehicle, the received input being associated with the determined current value of the metric of the vehicle, wherein each entry of the historical data associated with the driver includes the received input regarding the intended route of the vehicle, the determined current value of the metric of the vehicle, the anticipated value of the metric of the vehicle, and a corresponding geolocation of the vehicle.

(16) The apparatus according to any of (10) to (15), wherein the processing circuitry is further configured to record the identified driving pattern of the driver of the vehicle within the historical data associated with the driver of the vehicle.

(17) The apparatus according to any of (10) to (16), wherein the metric of the vehicle includes a vector of a trajectory of the vehicle.

(18) The apparatus according to any of (10) to (17), wherein, in order to generate the guidance information based on the received input regarding the intended route of the vehicle, the processing circuitry is further configured to convey the generated guidance information to a driver of the vehicle by one or more of audio and video.

(19) A method of vehicle guidance, comprising determining a current lane-level position of a vehicle, comparing the determined current lane-level position of the vehicle to an anticipated lane-level position of the vehicle, the anticipated lane-level position of the vehicle corresponding to a lane-level position of the vehicle within a predetermined route of the vehicle, receiving, based upon the comparison, an input regarding an intended route of the vehicle, and generating, via processing circuitry, guidance information based on the received input regarding the intended route of the vehicle.

(20) The method according to (19), wherein the receiving the input regarding the intended route of the vehicle includes determining alternate routes between a current position of the vehicle and a destination of the vehicle based on the determined current lane-level position of the vehicle.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A method of vehicle guidance, comprising:
   determining a predetermined route of a vehicle;
   determining a current value of a metric of the vehicle;
   determining an anticipated value of the metric of the vehicle corresponding to a value of the metric of the vehicle along the predetermined route of the vehicle;
   comparing the determined current value of the metric of the vehicle to the determined anticipated value of the metric of the vehicle, including:
      generating an error score of the determined current value of the metric of the vehicle and the determined anticipated value of the metric of the vehicle, and
      comparing the generated error score to a predetermined error score threshold, the predetermined error score threshold determined based upon historical data that is independent of tendencies of an individual driver;
   receiving, based upon the comparison, an input regarding an intended route of the vehicle; and
   generating, via processing circuitry, guidance information based on the received input regarding the intended route of the vehicle, wherein
   when the generated error score is equal to or greater than the predetermined error score threshold, the receiving, based upon the comparison, the input includes first querying a driver of the vehicle regarding the intended route and then receiving the input regarding the intended route, and
   when the generated error score is not equal to or greater than the predetermined error score threshold, the driver of the vehicle is not queried regarding the intended route.

2. The method according to claim 1, wherein the received input regarding the intended route of the vehicle includes an indication of whether a driver of the vehicle desires to deviate from the predetermined route of the vehicle.

3. The method according to claim 1, wherein the receiving the input regarding the intended route of the vehicle includes determining alternate routes between a current position of the vehicle and a destination of the vehicle based on the determined current value of the metric of the vehicle.

4. The method according to claim 1, wherein
   the determined anticipated value of the metric of the vehicle is determined based on a habit associated with a driver of the vehicle,
   the habit includes a driving pattern of the driver of the vehicle identified within historical data associated with the driver, and
   the historical data associated with the driver is stored within a historical database.

5. The method according to claim 1, wherein
   the generating the guidance information based on the received input regarding the intended route of the vehicle includes identifying a driving pattern of a driver of the vehicle based on the received input regarding the intended route of the vehicle and historical data associated with the driver of the vehicle, the received input being associated with the determined current value of the metric of the vehicle, and each entry of the historical data associated with the driver includes the received input regarding the intended route of the vehicle, the determined current value of the metric of the vehicle, the determined anticipated value of the metric of the vehicle, and a corresponding geolocation of the vehicle.

6. The method according to claim 5, wherein the generating the guidance information based on the received input regarding the intended route of the vehicle includes recording the identified driving pattern of the driver of the vehicle within the historical data associated with the driver of the vehicle.

7. The method according to claim 1, wherein the metric of the vehicle includes a vector of a trajectory of the vehicle.

8. The method according to claim 1, wherein the generating the guidance information based on the received input regarding the intended route of the vehicle includes conveying the generated guidance information to a driver of the vehicle by one or more of audio and video.

9. The method according to claim 1, wherein the received input regarding the intended route of the vehicle is provided by at least one of a voice command, an interaction with a touch screen of a user interface, an interaction with a control knob of a control panel, a facial muscle movement, and a facial feature.

10. The method according to claim 1, wherein the received input regarding the intended route of the vehicle is provided by at least one of a voice command, an interaction with a touch screen of a user interface, a facial muscle movement, and a facial feature.

11. An apparatus for vehicle guidance, comprising:
processing circuitry configured to
determine a predetermined route of a vehicle,
determine a current value of a metric of the vehicle,
determine an anticipated value of the metric of the vehicle corresponding to a value of the metric of the vehicle indicating a deviation from the predetermined route of the vehicle,
compare the determined current value of the metric of the vehicle to the determined anticipated value of the metric of the vehicle, including:
generating an error score of the determined current value of the metric of the vehicle and the determined anticipated value of the metric of the vehicle, and
comparing the generated error score to a predetermined error score threshold, the predetermined error score threshold determined based upon historical data that is independent of tendencies of an individual driver,
receive, based upon the comparison, an input regarding an intended route of the vehicle, and
generate guidance information based on the received input regarding the intended route of the vehicle, wherein
when the generated error score is equal to or greater than the predetermined error score threshold, receive, based upon the comparison, the input includes first querying a driver of the vehicle regarding the intended route and then receiving the input regarding the intended route, and when the generated error score is not equal to or greater than the predetermined error score threshold, the driver of the vehicle is not queried regarding the intended route.

12. The apparatus according to claim 11, wherein the received input regarding the intended route of the vehicle includes an indication of whether a driver of the vehicle desires to deviate from the predetermined route of the vehicle.

13. The apparatus according to claim 11, wherein, prior to receipt of the input regarding the intended route of the vehicle, the processing circuitry is further configured to determine alternate routes between a current position of the vehicle and a destination of the vehicle based on the determined current value of the metric of the vehicle.

14. The apparatus according to claim 11, wherein
the determined anticipated value of the metric of the vehicle is determined based on a habit associated with a driver of the vehicle,
the habit includes a driving pattern of the driver of the vehicle identified within historical data associated with the driver, and
the historical data associated with the driver is stored within a historical database.

15. The apparatus according to claim 11, wherein
in order to generate the guidance information based on the received input regarding the intended route of the vehicle, the processing circuitry is further configured to identify a driving pattern of a driver of the vehicle based on the received input regarding the intended route of the vehicle and historical data associated with the driver of the vehicle, the received input being associated with the determined current value of the metric of the vehicle, and
each entry of the historical data associated with the driver includes the received input regarding the intended route of the vehicle, the determined current value of the metric of the vehicle, the determined anticipated value of the metric of the vehicle, and a corresponding geolocation of the vehicle.

16. The apparatus according to claim 15, wherein the processing circuitry is further configured to record the identified driving pattern of the driver of the vehicle within the historical data associated with the driver of the vehicle.

17. The apparatus according to claim 11, wherein the metric of the vehicle includes a vector of a trajectory of the vehicle.

18. The apparatus according to claim 11, wherein, in order to generate the guidance information based on the received input regarding the intended route of the vehicle, the processing circuitry is further configured to convey the generated guidance information to a driver of the vehicle by one or more of audio and video.

19. A method of vehicle guidance, comprising:
determining a predetermined route of a vehicle;
determining a current lane-level position of the vehicle using an annotated navigational map;
determining an anticipated lane-level position of the vehicle corresponding to a lane-level position of the vehicle along the predetermined route of the vehicle;
comparing the determined current lane-level position of the vehicle to the determined anticipated lane-level position of the vehicle, including:
generating an error score of the determined current lane-level position of the vehicle and the determined anticipated lane-level position of the vehicle, and comparing the generated error score to a predetermined error score threshold, the predetermined error score threshold determined based upon historical data that is independent of tendencies of an individual driver;

receiving, based upon the comparison, an input regarding an intended route of the vehicle; and generating, via processing circuitry, guidance information based on the received input regarding the intended route of the vehicle, wherein when the generated error score is equal to or greater than the predetermined error score threshold, the receiving, based upon the comparison, the input includes first querying a driver of the vehicle regarding the intended route and then receiving the input regarding the intended route, and when the generated error score is not equal to or greater than the predetermined error score threshold, the driver of the vehicle is not queried regarding the intended route.

20. The method according to claim 19, wherein the receiving the input regarding the intended route of the vehicle includes determining alternate routes between a current position of the vehicle and a destination of the vehicle based on the determined current lane-level position of the vehicle.

* * * * *